US009094767B2

(12) United States Patent
Lafky et al.

(10) Patent No.: US 9,094,767 B2
(45) Date of Patent: Jul. 28, 2015

(54) HEADSET PLUG UNIVERSAL AUTO SWITCHER

(75) Inventors: Carl Lafky, Camas, WA (US); Alex Danielson, Vancouver, WA (US)

(73) Assignee: Logitech Europe S.A., Lausanne (CH)

( * ) Notice: Subject to any disclaimer, the term of this patent is extended or adjusted under 35 U.S.C. 154(b) by 667 days.

(21) Appl. No.: 13/212,884

(22) Filed: Aug. 18, 2011

(65) Prior Publication Data

US 2013/0044892 A1 Feb. 21, 2013

(51) Int. Cl.

| | |
|---|---|
| ***H04R 1/10*** | (2006.01) |
| ***H02B 1/00*** | (2006.01) |
| ***H04R 29/00*** | (2006.01) |
| *H04R 3/00* | (2006.01) |
| *H04R 5/04* | (2006.01) |

(52) U.S. Cl.

CPC .............. *H04R 29/001* (2013.01); *H04R 3/007* (2013.01); *H04R 5/04* (2013.01); *H04R 2420/05* (2013.01)

(58) Field of Classification Search

CPC ........ H04R 1/00; H04R 1/1041; H04R 29/00; H04R 29/001; H04R 3/007; H04R 5/04; H04R 2420/05

USPC .......... 381/74, 77, 80, 81, 111, 122, 123, 309

See application file for complete search history.

(56) References Cited

U.S. PATENT DOCUMENTS 4,219,789 A 8/1980 Frangos
5,043,938 A 8/1991 Ebersole
5,317,641 A * 5/1994 Yasuda et al. ................. 381/119
5,754,890 A 5/1998 Holmdahl et al.
5,832,244 A 11/1998 Jolley et al.
5,920,734 A 7/1999 Holmdahl
5,935,224 A 8/1999 Svancarek et al.
6,094,063 A 7/2000 St. Pierre, Jr. et al.
6,442,734 B1 8/2002 Hanson et al.
6,460,094 B1 10/2002 Hanson et al.
6,625,790 B1 9/2003 Casebolt et al.

(Continued)

FOREIGN PATENT DOCUMENTS

CN 101232742 * 7/2008
CN 101232742 A 7/2008

OTHER PUBLICATIONS

"Local Connectivity: Wired Analogue Audio"; 2007, OMTP Limited, 15 pages.

(Continued)

*Primary Examiner* — Vivian Chin
*Assistant Examiner* — William A Jerez Lora
(74) *Attorney, Agent, or Firm* — Kilpatrick Townsend & Stockton LLP

(57) ABSTRACT

One embodiment of the invention is directed to a switchable plug comprising a first incoming line configured to carry a signal from a source device, a second incoming line configured to carry a signal from the source device, a Mic Bias output line, a Ground output line, and a switch control. The switch control is operably connected with the first incoming line, the second incoming line, the Mic Bias output line and the Ground output line. The switch control is configured to detect a type of the signal carried on the first incoming line and a type of the signal carried on the second incoming line, from the source device. The switch control is further configured to automatically route a Mic Bias type signal to the Mic Bias output line and a Ground type signal to the Ground output line, without user intervention.

25 Claims, 7 Drawing Sheets

(56) References Cited

U.S. PATENT DOCUMENTS

| | | | | |
|---|---|---|---|---|
| 6,654,652 | B1 * | 11/2003 | Dalton et al. | 700/94 |
| 6,725,318 | B1 | 4/2004 | Sherman et al. | |
| 6,795,949 | B2 | 9/2004 | Hanson et al. | |
| 6,845,023 | B2 | 1/2005 | Philips et al. | |
| 7,096,435 | B2 | 8/2006 | Hanson et al. | |
| 7,241,179 | B2 | 7/2007 | Chennakeshu | |
| 7,382,760 | B2 | 6/2008 | Slamka et al. | |
| 7,672,743 | B2 | 3/2010 | Messer et al. | |
| 7,780,478 | B2 | 8/2010 | Tang et al. | |
| 7,789,697 | B2 | 9/2010 | Fiennes | |
| 7,912,501 | B2 | 3/2011 | Johnson et al. | |
| 7,961,895 | B2 | 6/2011 | Wu et al. | |
| 8,150,046 | B2 * | 4/2012 | Hansson et al. | 381/58 |
| 2008/0130911 | A1 * | 6/2008 | Tsen | 381/74 |
| 2008/0137896 | A1 * | 6/2008 | Tsen | 381/370 |
| 2008/0164994 | A1 | 7/2008 | Johnson et al. | |
| 2009/0004923 | A1 | 1/2009 | Tang et al. | |
| 2009/0086010 | A1 | 4/2009 | Tiphane | |
| 2010/0215183 | A1 * | 8/2010 | Hansson et al. | 381/58 |
| 2010/0273356 | A1 | 10/2010 | Tang et al. | |
| 2011/0150234 | A1 | 6/2011 | Johnson et al. | |

OTHER PUBLICATIONS

First Office Action in Chinese Patent Application No. 201210293123.X, dated Sep. 3, 2014, 20 pages.

* cited by examiner

HEADSET PLUG UNIVERSAL AUTO SWITCHER

CROSS-REFERENCES TO RELATED APPLICATIONS

Not Applicable

BACKGROUND OF THE INVENTION

Devices (e.g., cell phones, tablets, etc.) that utilize 4 pin (3.5 or 2.5 mm) plugs as headset interfaces, generally utilize one or two incompatible standard configurations. The headset will not operate properly if using an incompatible configuration. An adapter may be used, but using an adapter has disadvantages. For example, an adapter can be easily lost, it adds length to the plug (making the plug act as a longer lever to break off or inflict damage to the audio device's jack) and the user is required to determine when to utilize the adapter and what type of adapter is needed.

Embodiments of the invention address these and other problems individually and collectively.

BRIEF SUMMARY OF THE INVENTION

Embodiments of the invention are directed to Apparatuses, Systems, and Methods that allow an audio output device such as a headset to automatically switch to the correct configuration of operation for interfacing with another device.

One embodiment of the invention is directed to a switchable plug comprising a first incoming line configured to carry a signal from a source device, a second incoming line configured to carry a signal from the source device, a Mic Bias output line, a Ground output line, and a switch control. The switch control is operably connected with the first incoming line, the second incoming line, the Mic Bias output line and the Ground output line. The switch control is configured to detect the type of the signal carried on the first incoming line and the type of the signal carried on the second incoming line, from the source device. The switch control is further configured to automatically route a Mic Bias type signal to the Mic Bias output line and a Ground type signal to the Ground output line, without user intervention.

Another embodiment of the invention is directed to a system comprising an audio source device comprising a plug interface and an audio output device comprising a plug. The plug comprises a first incoming line configured to carry a signal from the audio source device, a second incoming line configured to carry a signal from the audio source device, a Mic Bias output line, a Ground output line, and a switch control. The switch control is operably connected with the first incoming line, the second incoming line, the Mic Bias output line and the Ground output line. The switch control is configured to detect the type of the signal carried on the first incoming line and the type of the signal carried on the second incoming line from the source device. The switch control is further configured to automatically route a Mic Bias type signal to the Mic Bias output line and a Ground type signal to the Ground output line, without user intervention. The audio output device is capable of being coupled with the audio source device via the plug and the plug interface.

Another embodiment of the invention is directed to a headset comprising an audio output component, a microphone coupled with the audio output component, and a switchable plug coupled with the audio output component and the microphone. The switchable plug comprises a first incoming line configured to carry a signal from a source device, a second incoming line configured to carry a signal from the source device, a Mic Bias output line, a Ground output line, and a switch control. The switch control is operably connected with the first incoming line, the second incoming line, the Mic Bias output line and the Ground output line. The switch control is configured to detect the type of the signal carried on the first incoming line and the type of the signal carried on the second incoming line from the source device. The switch control is further configured to automatically route a Mic Bias type signal to the Mic Bias output line and a Ground type signal to the Ground output line, without user intervention.

These and other embodiments of the invention are described in further detail below.

DETAILED DESCRIPTION OF THE INVENTION

Devices that utilize 4 pin plugs as headset interfaces (such as cell phones and tablets) generally utilize one or two incompatible standard configurations. Examples of 4 pin plugs include 2.5 mm, 3.5 mm, ¼", etc. Embodiments of the invention will allow a headset to automatically switch to the correct configuration without any user interaction (other than inserting the plug into the jack).

Devices that only deliver sound through a 3.5 or 2.5 mm jack (such as portable radios MP3 players, portable DVD payers, etc.) will also work with embodiments of this invention by utilizing a default configured grounding scheme as explained in further detail below.

Figure 1:
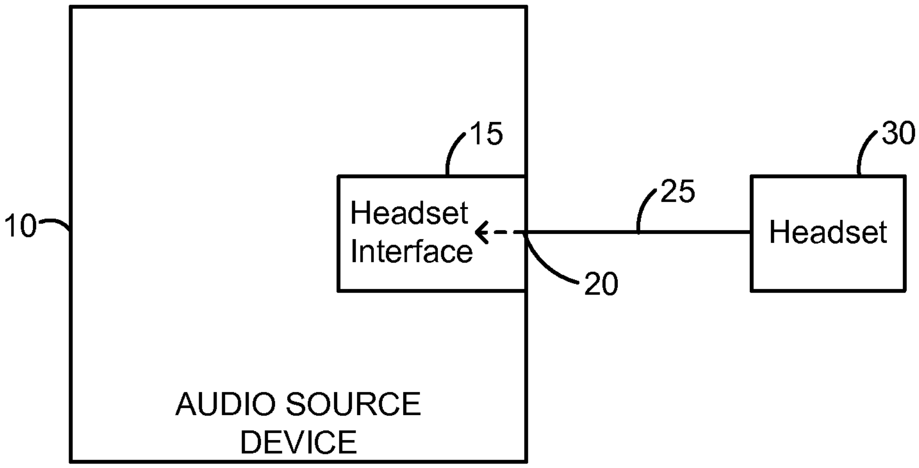
FIG. 1 is a system diagram illustrating an exemplary system according to an embodiment of the invention.

As shown in the exemplary system diagram of FIG. 1, an audio source device 10 may have a headset interface 15 (e.g., a jack) for engaging with an audio output device such as headset 30. The headset 30 may have a cable 25 ending in a universal automatically switchable plug 20. The headset 30 may also include (not shown) an audio output component (e.g., headphones) and a microphone coupled with the audio output component (e.g. a mic). The plug 20 may be inserted into the headset interface 15 to connect the headset to the audio source device. For purposes of illustration, an audio source device and a headset are shown in the system of FIG. 1 and discussed as examples throughout this application. The specific configurations discussed herein are merely illustrative examples. Various other devices and interfaces may be used with embodiments of the invention. In addition to audio source devices such as a cell phones or tablet PCs, other examples of devices include laptops, mobile phones, personal digital assistants (PDAs), computers, MP3 players, portable radios, portable DVD players, receivers, etc. In addition to a headset, other examples of devices include speakers, speakers with a microphone built in, headphones, ear buds, ear monitors, etc.

Figure 2:
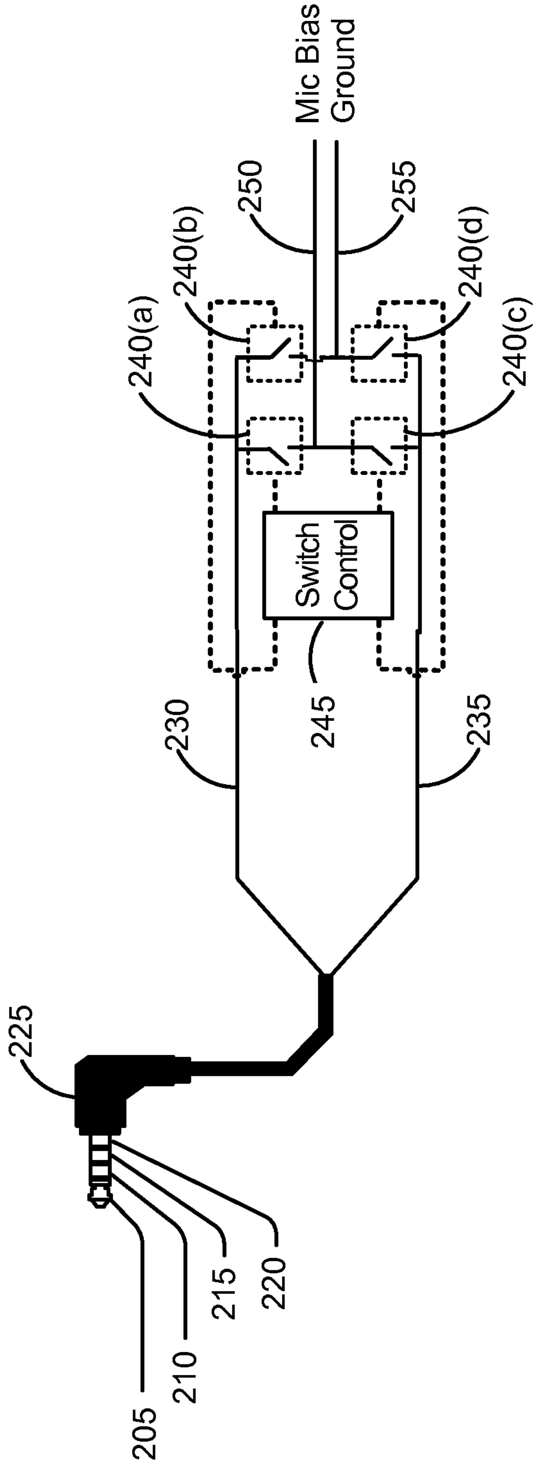
FIG. 2 is a diagram of a switchable plug according to an embodiment of the invention.

The location of the switch control and the ground switching circuit (e.g., switches 240(*b*) and 240(*d*) in FIG. 2) may be optimally placed in the plug, however any or all of the components could be located in the cord, incorporated in an inline control, in the microphone housing, in the headset, in an earbud housing or other location within the contiguous headset device and still operate effectively. For example, the switch control could be located in one location (e.g., in the plug) and the switches could be located in another location (e.g., the cord), all the components could be located together (e.g., in the plug, in the cord, etc.), etc.

FIG. 2 illustrates a 4 pin plug 225 and two incompatible standard configurations. Pin 1 (e.g., the tip 205) may be configured as left audio. Pin 2 (e.g., ring 1 (210)) may be configured as right audio. Pins 3 (e.g., ring 2 (215)) and 4 (e.g., sleeve 220) may be configured as either Ground or Mic Bias, depending upon the audio device manufacturer. The headset will not operate properly in connection with a particular device if the Mic Bias and Ground are reversed. As explained above, a separate adapter is typically used to switch the two specific signals, but it can be lost easily, it adds length to the plug (making the plug act as a longer lever to break off or inflict damage to the audio device's jack), and the user is required to determine when to utilize the adapter and what type of adapter is needed. For example, since an adapter is simply hardwired to switch the two specific signals, a user must know whether he needs an adapter in the first place, and then what type of adapter he needs.

FIG. 2 also shows a blown up diagram of the two lines from pins 3 (215) and 4 (220) of the plug 225, pin line 3 (230) and pin line 4 (235). FIG. 2 further shows four switches 240(*a*)-240(*d*), an electronic Switch Control 245, and properly oriented lines out Mic Bias 250 and Ground 255. In operation the Switch Control 245 determines which incoming line is the Mic Bias and which is Ground (e.g., the type of the signal), and then routes the signals appropriately without user intervention. Thus, a user need only plug the headset plug into the audio source device and then the switch control 245 will determine whether pin line 3 (230) or pin line 4 (235) is the Mic Bias or Ground, and then route the signal for the Mic bias to the Mic Bias out line 250 and the Ground to the Ground out line 255. For example, to determine which pin line is the Mic Bias and which pin line is Ground, the Switch Control 245 may determine the voltage of pin line 3 (230) and the voltage of pin line 4 (235) and compare the voltage of the two lines. The line with the higher voltage may be determined to be the Mic Bias and the line with the lower voltage may be determined to be Ground. Thus, the Switch Control 245 routes the line with the higher voltage to the Mic Bias out line 250 and the line with the lower voltage to the Ground out line 255.

The switchable plug 225 may also include a line from pin 1 and a line from pin 2 and a left audio output line and a right audio output line (not shown). The Switch Control 245 may determine whether pin line 1 or pin line 2 is the left audio or right audio and then route the signal for the left audio to the let audio output line and the signal for the right audio to the right audio output line. Typically pin line 1 is configured as left audio and pin line 2 is configured as right audio. Thus, the Switch Control 245 can route the signal on pin line 1 to the left audio output line and the signal on pin line 2 to the right audio output line. In an alternate embodiment, if desired, the Switch Control 245 may route the audio signals to alternate output lines.

Figure 3:
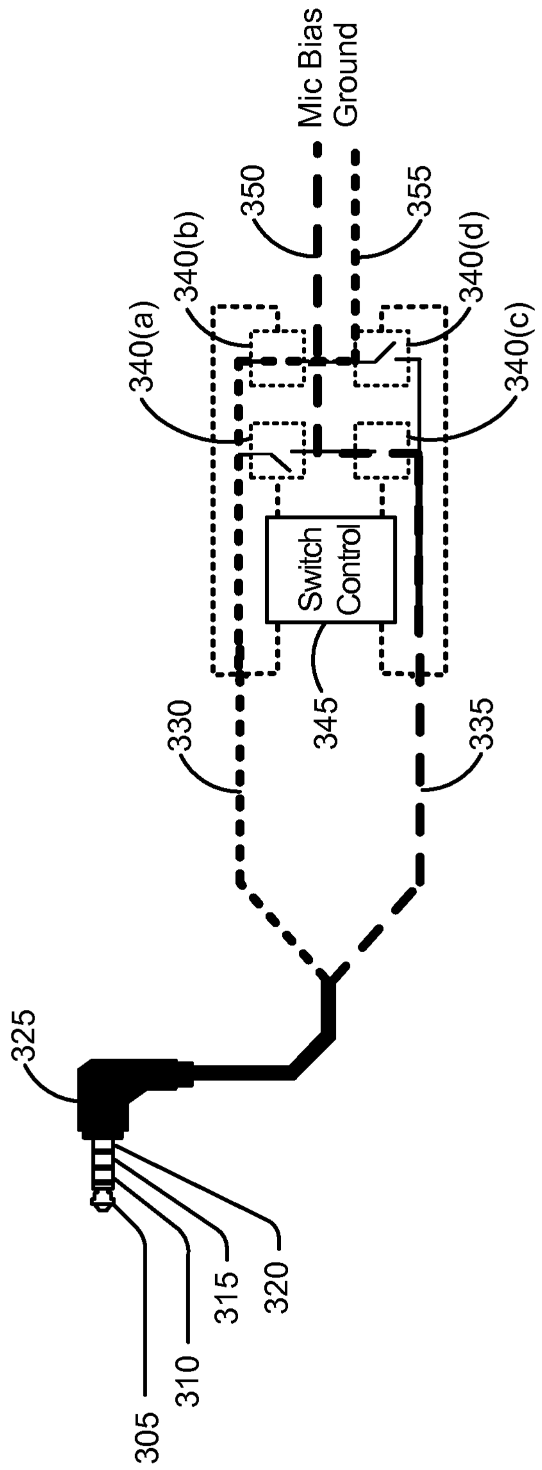
FIG. 3 is a diagram of a switchable plug according to an embodiment of the invention.

FIG. 3 shows plug 325 and illustrates one orientation where pin 3 (315) is configured as Ground and pin 4 (320) is configured as Mic Bias. This figure shows one switch 340(*b*) connecting the Pin 3 line 330 to the Ground output line 355 and another switch 340(*c*) connecting the Pin 4 line 335 to the Mic Bias output line 350. As described for FIG. 2, Pin 1 (305) may be configured as left audio and Pin 2 (310) may be configured as right audio. FIG. 3 also shows also shows a blown up diagram of the two lines from pins 3 (315) and 4 (320) of the plug 325, pin line 3 (330) and pin line 4 (335). FIG. 3 further shows four switches 340(*a*)-340(*d*), an electronic Switch Control 345, and properly oriented lines out Mic Bias 350 and Ground 355.

In operation the Switch Control 345 determines which incoming line is the Mic Bias and which is Ground, and then routes the signals appropriately without user intervention. For example, a user need only plug the headset plug into the audio source device and then the switch control 345 will determine (in this example) that pin line 3 (330) is Ground and route the Ground through switch 340(*b*) to the line out for Ground (355). And the switch control 345 will determine that the pin line 4 (335) is the Mic Bias and thus route the signal for the Mic Bias through switch 340(*c*) to the Mic Bias out line 350. For example, to determine which pin line is the Mic Bias and which pin line is Ground, the Switch Control 345 may determine the voltage of pin line 3 (330) and the voltage of pin line 4 (335) and compare the voltage of the two lines. The line with the higher voltage may be determined to be the Mic Bias and the line with the lower voltage may be determined to be Ground. Thus, the Switch Control 345 routes the line with the higher voltage to the Mic Bias out line 350 and the line with the lower voltage to the Ground out line 355.

The switchable plug 325 may also include a line from pin 1 and a line from pin 2 and a left audio output line and a right audio output line (not shown). The Switch Control 345 may determine whether pin line 1 or pin line 2 is the left audio or right audio and then route the signal for the left audio to the let audio output line and the signal for the right audio to the right audio output line. Typically pin line 1 is configured as left audio and pin line 2 is configured as right audio. Thus, the Switch Control 345 can route the signal on pin line 1 to the left audio output line and the signal on pin line 2 to the right audio output line. In an alternate embodiment, if desired, the Switch Control 345 may route the audio signals to alternate output lines.

Figure 4:
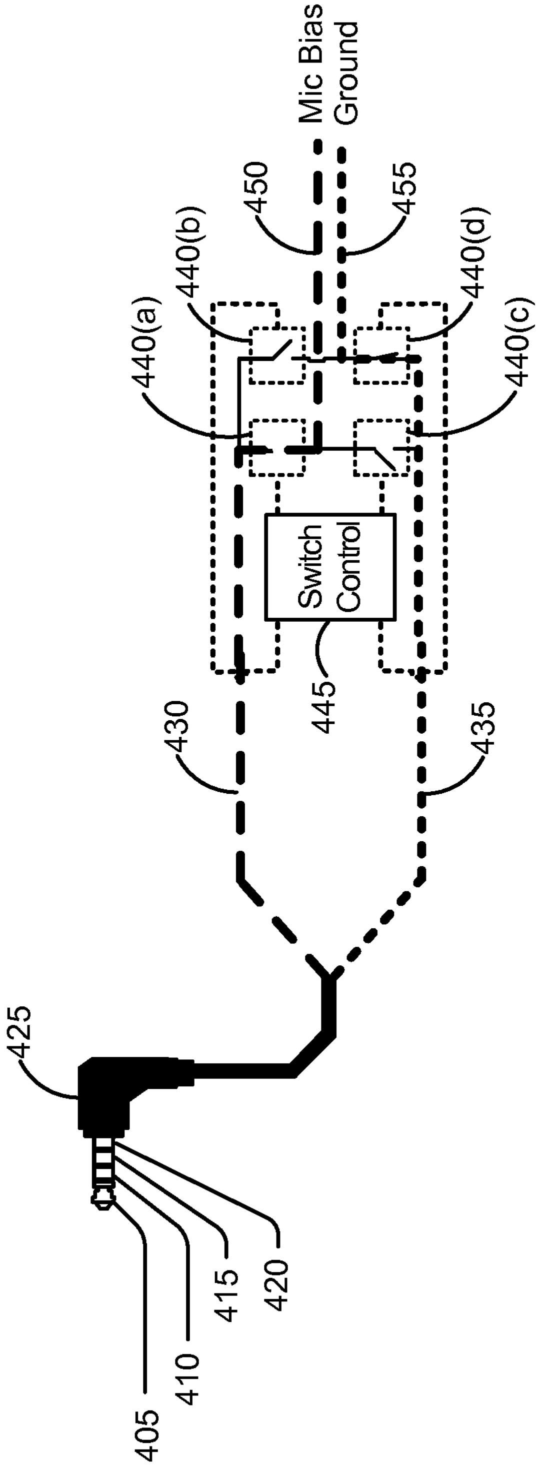
FIG. 4 is a diagram of a switchable plug according to an embodiment of the invention.

Conversely, FIG. 4 shows plug 425 and illustrates the alternate orientation where pin 3 (415) is Mic Bias and pin 4 (420) is Ground. Here the Pin 3 line 430 connects to the Mic Bias output line 450 and the Pin 4 line 435 connects to the Ground output line 455. As described for FIGS. 2 and 3, Pin 1 (405) may be configured as left audio and Pin 2 (410) may be configured as right audio. FIG. 4 also shows also shows a blown up diagram of the two lines from pins 3 (415) and 4 (420) of the plug 425, pin line 3 (430) and pin line 4 (435). FIG. 4 further shows four switches 440(*a*)-440(*d*), an electronic Switch Control 445, and properly oriented lines out Mic Bias 450 and Ground 455.

In operation the Switch Control 445 determines which incoming line is the Mic Bias and which is Ground, and then routes the signals appropriately without user intervention. For example, a user need only plug the headset plug into the audio source device and then the switch control 445 will determine (in this example) that pin line 4 (435) is Ground and route the Ground through switch 440(*d*) to the line out for Ground (455). And the switch control 445 will determine that the pin line 3 (430) is the Mic Bias and thus route the signal for the Mic Bias through switch 440(*a*) to the Mic Bias out line 450. For example, to determine which pin line is the Mic Bias and which pin line is Ground, the Switch Control 445 may determine the voltage of pin line 3 (430) and the voltage of pin line 4 (435) and compare the voltage of the two lines. The line with the higher voltage may be determined to be the Mic Bias and the line with the lower voltage may be determined to be Ground. Thus, the Switch Control 445 routes the line with the higher voltage to the Mic Bias out line 450 and the line with the lower voltage to the Ground out line 455.

The switchable plug 425 may also include a line from pin 1 and a line from pin 2 and a left audio output line and a right audio output line (not shown). The Switch Control 445 may determine whether pin line 1 or pin line 2 is the left audio or right audio and then route the signal for the left audio to the let audio output line and the signal for the right audio to the right audio output line. Typically pin line 1 is configured as left audio and pin line 2 is configured as right audio. Thus, the Switch Control 445 can route the signal on pin line 1 to the left audio output line and the signal on pin line 2 to the right audio output line. In an alternate embodiment, if desired, the Switch Control 445 may route the audio signals to alternate output lines.

Many audio devices with only sound playback capability utilize three of the four headset pins. Embodiments of the invention also provide for such devices. For example, these three pin audio devices may have pin 1 configured for left audio, pin 2 configured for right audio, and pin 3 configured for Ground. The missing line is the Mic Bias line. Since this is also the line that may supply the power to the switch control, without this power, the Switch Control would leave the ground line unconnected.

Figure 5:
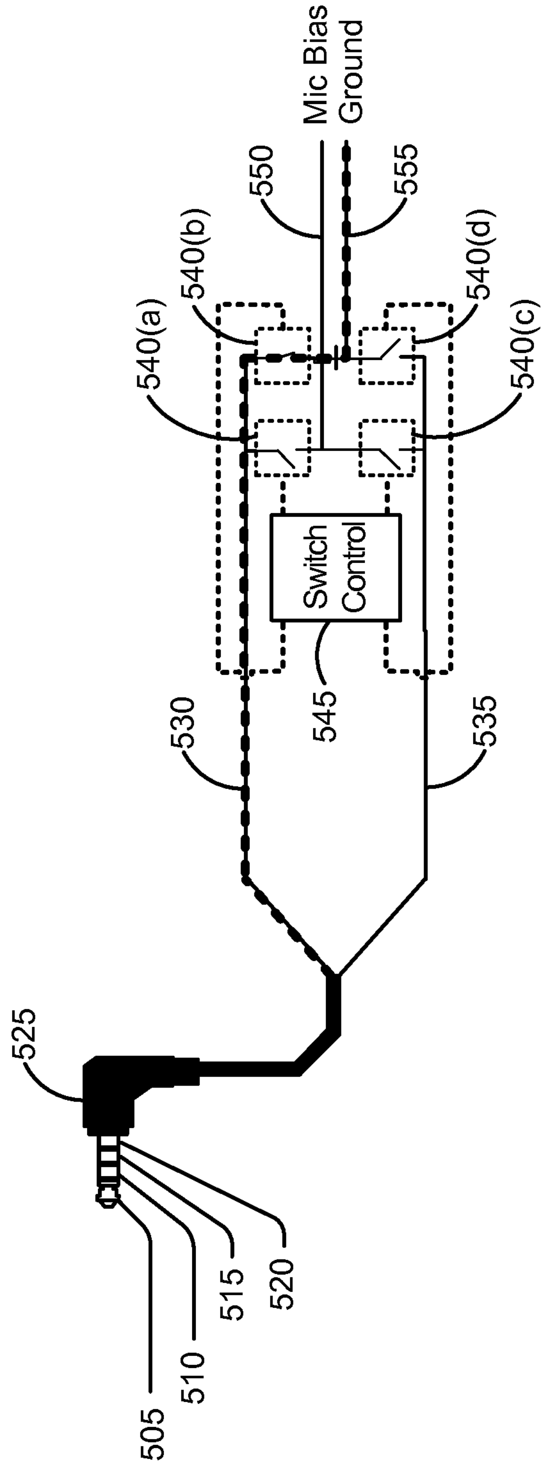
FIG. 5 is a diagram of a switchable plug according to an embodiment of the invention.

One method to overcome this problem is to utilize a novel pre-configuration scheme wherein one switch is normally closed (e.g., has a default closed position) to connect Pin 3 line to the Ground Output line. Devices with only three lines connect to a 4 pin plug through the first three pins. FIG. 5 illustrates proper functioning of the headset with three pin jack audio devices is insured with this configuration. The Microphone is non-operational for these devices.

In FIG. 5, pin 1 (505) may be configured for left audio, pin 2 (510) for right audio and pin 3 (515) for Ground. FIG. 5 also shows a blown up diagram of the two lines from pins 3 (515) and 4 (520) of the plug 525, pin line 3 (530) and pin line 4 (535). The pin 4 input from the audio source device for the Mic Bias is missing in this example. FIG. 5 further shows four switches 540(*a*)-540(*d*), an electronic Switch Control 545, and properly oriented lines out Mic Bias 550 and Ground 555. In operation the Switch Control 545 determines that the connected audio source device is connected with only 3 pins (e.g., the Mic Bias line is missing) and routes the Ground from pin 3 (515) through pin line 3 (530) through switch 540(*b*) to the line out for Ground. For example, to determine that the device is a device with only 3 pins, the Switch Control 545 may determine the voltage of pin line 3 (530) and the voltage of pin line 4 (535) and compare the voltage of the two lines. If there is no difference between the voltage of pin line 3 (530) and the voltage of pin line 4 (535) (e.g., the voltage on the lines are the same), then the Switch Control 545 may determine that there is no Mic Bias. Thus, the Switch Control 545 will route pin line 3 (530) to the line out for Ground (555).

The switchable plug 525 may also include a line from pin 1 and a line from pin 2 and a left audio output line and a right audio output line (not shown). The Switch Control 545 may determine whether pin line 1 or pin line 2 is the left audio or right audio and then route the signal for the left audio to the let audio output line and the signal for the right audio to the right audio output line. Typically pin line 1 is configured as left audio and pin line 2 is configured as right audio. Thus, the Switch Control 345 can route the signal on pin line 1 to the left audio output line and the signal on pin line 2 to the right audio output line. In an alternate embodiment, if desired, the Switch Control 545 may route the audio signals to alternate output lines.

Figure 6:
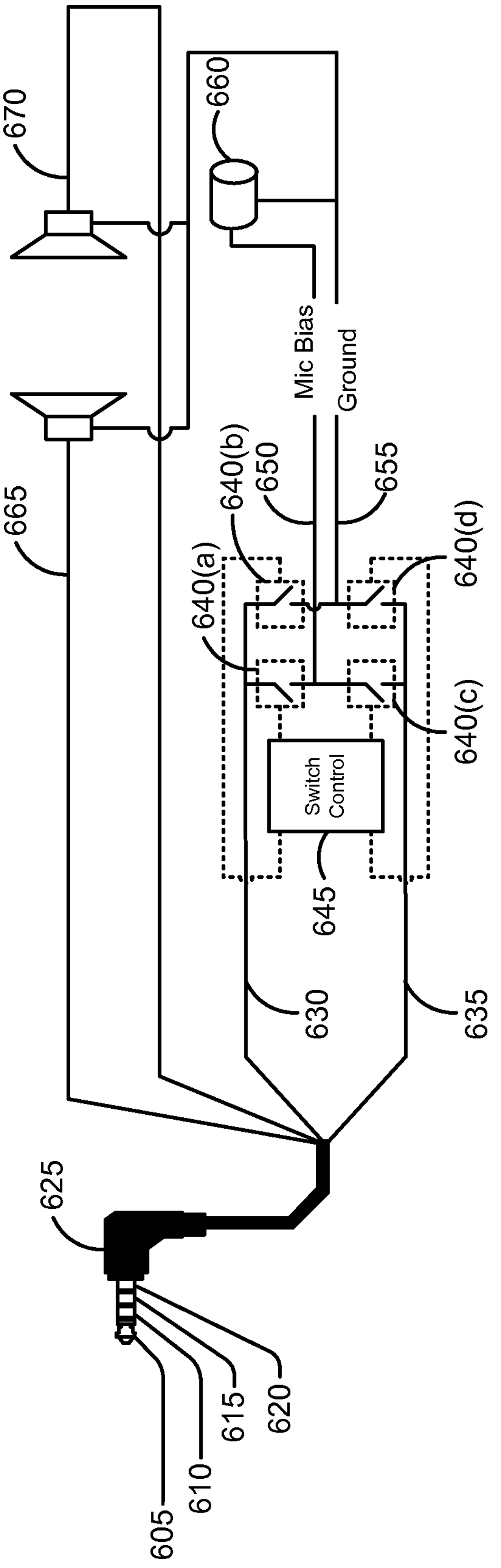
FIG. 6 is a diagram of a switchable plug according to an embodiment of the invention.

FIG. 6 shows a switchable plug 625 according to embodiments of the invention. Pin 1 (e.g., the tip 605) may be configured as left audio. Pin 2 (e.g., ring 1 (610)) may be configured as right audio. Pins 3 (e.g., ring 2 (615)) and 4 (e.g., sleeve 620) may be configured as either Ground or Mic Bias, depending upon the audio device manufacturer. FIG. 6 also shows a blown up diagram of the lines from each of the pins. Pin 1 line 665, Pin 2 line 670, Pin 3 line 630 and Pin 4 line 635. FIG. 6 further shows four switches 640(*a*)-640(*d*), an electronic Switch Control 645, properly oriented lines out Mic Bias 650 and Ground 655, and a microphone 660.

In operation the Switch Control 645 determines which incoming line is the Mic Bias and which is Ground (e.g., the type of the signal), and then routes the signals appropriately without user intervention. Thus, a user need only plug the headset plug into the audio source device and then the switch control 645 will determine whether pin line 3 (630) or pin line 4 (635) is the Mic Bias or Ground, and then route the signal for the Mic bias to the Mic Bias out line 650 and the Ground to the Ground out line 655. For example, to determine which pin line is the Mic Bias and which pin line is Ground, the Switch Control 645 may determine the voltage of pin line 3 (630) and the voltage of pin line 4 (635) and compare the voltage of the two lines. The line with the higher voltage may be determined to be the Mic Bias and the line with the lower voltage may be determined to be Ground. Thus, the Switch Control 645 routes the line with the higher voltage to the Mic Bias out line 650 and the line with the lower voltage to the Ground out line 655.

The switchable plug 625 may also determine whether pin line 1 (665) or pin line 2 (670) is the left audio or right audio and then route the signal for the left audio to the let audio output line and the signal for the right audio to the right audio output line. Typically pin line 1 (665) is configured as left audio and pin line 2 (670) is configured as right audio. Thus, the Switch Control 645 can route the signal on pin line 1 to the left audio output line and the signal on pin line 2 to the right audio output line. In an alternate embodiment, if desired, the Switch Control 645 may route the audio signals to alternate output lines.

Figure 7:
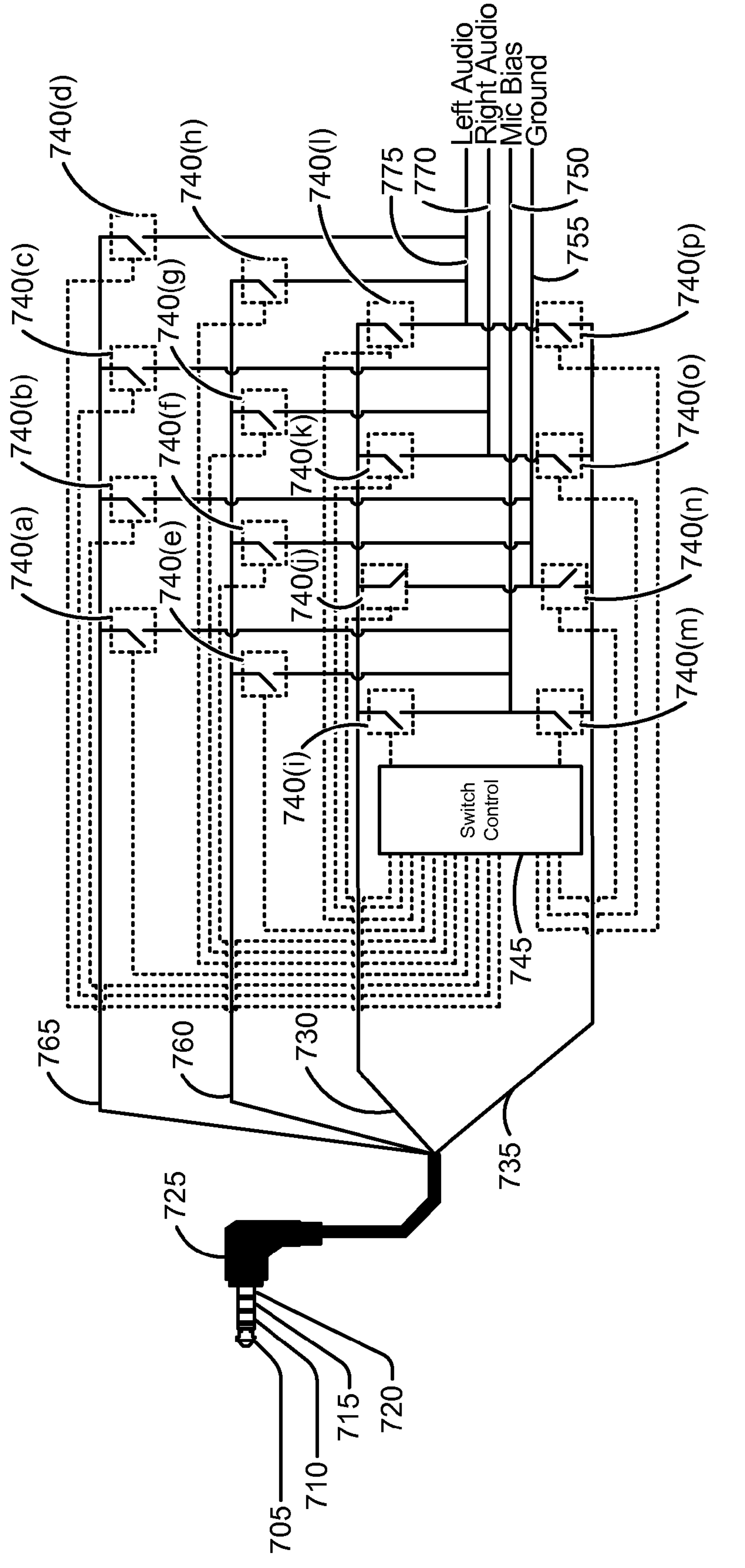
FIG. 7 is a diagram of a switchable plug according to an embodiment of the invention.

The examples above describe incompatible standards related to the Ground and Mic Bias pins as well as 3 pin devices versus 4 pin devices, however, in embodiments of the invention the switch control could also switch the left audio (pin 1) and right audio (pin 2). For example, the switch control would determine the Ground and Mic Bias as described above, and then would determine the left audio and the right audio and route those accordingly to a left audio out line and a right audio out line to the audio output device (e.g., headset). In this embodiment, it would not matter which incoming line contained which signal (e.g., left audio, right audio, mic bias, ground, video, etc.), the switch control in the plug would detect which type of signal is coming on the pin lines from the source device and would automatically route the signals to the appropriate lines out. This embodiment is shown in FIG. 7. Thus, embodiments of the invention covers the detection and automatic routing of any combination of signals applied to a multi-pin plug associated with audio content, including, but not limited to, left audio, right audio, Ground, and Microphone Bias.

In embodiments of the invention, the technology implementation of the switches and switch control may be electromechanical (such as relays), electronic (such as FETs and digital logic), electro-optic (optically isolated relays), or other technologies to be developed.

As mentioned above, traditionally a consumer may use an adapter when presented with an alternate device configuration. There are many disadvantages of the adapter. For example, the user must determine when an adapter is required and what type of adapter is needed. Also, the adapter can be easily lost or misplaced. Further, an adapter can grow the size of the plug, allowing the adapter plus the plug to act as a larger lever more prone to breaking or causing damage to the jack of the audio device.

Embodiments of the invention have many benefits and advantages. For example, embodiments of the invention allow for a truly universal headset, operating with any standard audio device utilizing a 4 connector (e.g., a 2.5 mm, 3.5 mm, or ¼") jack. Further, the operation is completely automatic, leading to a seamless, optimal, and simple user experience. Moreover, building the circuit into the plug prevents the user from an additional accessory to lose. In addition, the size of the plug can stay the same, preventing the possible mechanical damage issues associated with an adapter.

As will be understood by those of skill in the art, the present invention may be embodied in other specific forms without departing from the essential characteristics thereof. Accordingly, the foregoing disclosure is intended to be illustrative, but not limiting, of the scope of the invention which is set forth in the following claims.

What is claimed is:

1. A switchable plug comprising:
- a first incoming line configured to carry a signal from a source device;
- a second incoming line configured to carry a signal from the source device;
- a Mic Bias output line;
- a Ground output line; and
- a switch control operably connected with the first incoming line configured to carry a signal from the source device, the second incoming line configured to carry a signal from the source device, the Mic Bias output line and the Ground output line,
- the switch control configured to detect a type of the signal carried on the first incoming line from the source device and a type of the signal carried on the second incoming line from the source device by determining a voltage of the first incoming line and a voltage of the second incoming line, and comparing the voltage of the first incoming line and the voltage of the second incoming line,
- the switch control further configured to automatically route a Mic Bias type signal to the Mic Bias output line and a Ground type signal to the Ground output line, without user intervention.

2. The switchable plug of claim 1, wherein the switch control is further configured to route the signal with the higher voltage to the Mic Bias output line and the signal with the lower voltage to the Ground output line.

3. The switchable plug of claim 1, further comprising:
- a switch operably connected with the switch control and the Ground output line, the switch further configured to be in a default closed position.

4. The switchable plug of claim 1, wherein the first incoming line is coupled with a pin 3 on the source device, and wherein the switch control is further configured to automatically route the signal on the first incoming line to the Ground output line if the voltage of the first incoming line and the voltage of the second incoming line are the same.

5. The switchable plug of claim 1 further comprising:
- a left audio output line operably connected with the switch control; and
- a right audio output line operably connected with the switch control;
- the switch control further configured to route a left audio type signal to the left audio output line and a right audio type signal to the right audio output line.

6. The switchable plug of claim 1, wherein the switch control is configured to route the Mic Bias type signal to the Mic Bias output line and the Ground type signal to the Ground output line, regardless of whether the Mic Bias type signal or the Ground type signal is carried by the first incoming line or by the second incoming line.

7. A system comprising:
- an audio source device comprising a plug interface;
- an audio output device comprising a plug, the plug comprising:
- a first incoming line configured to carry a signal from the audio source device;
- a second incoming line configured to carry a signal from the audio source device;
- a Mic Bias output line;
- a Ground output line; and
- a switch control operably connected with the first incoming line, the second incoming line, the Mic Bias output line and the Ground output line,
- the switch control configured to detect the type of the signal carried on the first incoming line and the type of the signal carried on the second incoming line from the source device by determining a voltage of the first incoming line and a voltage of the second incoming line, and comparing the voltage of the first incoming line and the voltage of the second incoming line,
- the switch control further configured to automatically route a Mic Bias type signal to the Mic Bias output line and a Ground type signal to the Ground output line, without user intervention,
- the audio output device capable of being coupled with the audio source device via the plug and the plug interface.

8. The system of claim 7, wherein the switch control is further configured to route the signal with the higher voltage to the Mic Bias output line and the signal with the lower voltage to the Ground output line.

9. The system of claim 7, further comprising:
- a switch operably connected with the switch control and the Ground output line, the switch further configured to be in a default closed position.

10. The system of claim 7, wherein the first incoming line is coupled with a pin 3 on the source device, and wherein the switch control is further configured to automatically route the signal on the first incoming line to the Ground output line if the voltage of the first incoming line and the voltage of the second incoming line are the same.

11. The system of claim 7, further comprising:
- a left audio output line operably connected with the switch control; and
- a right audio output line operably connected with the switch control;
- the switch control further configured to route a left audio type signal to the left audio output line and a right audio type signal to the right audio output line.

12. A headset comprising:
- an audio output component;
- a microphone coupled with the audio output component;
- a switchable plug coupled with the audio output component and the microphone, the switchable plug comprising:
- a first incoming line configured to carry a signal from a source device;

a second incoming line configured to carry a signal from the source device;

a Mic Bias output line;

a Ground output line; and a switch control operably connected with the first incoming line, the second incoming line, the Mic Bias output line and the Ground output line, the switch control configured to detect the type of the signal carried on the first incoming line and the type of the signal carried on the second incoming line from the source device by determining a voltage of the first incoming line and a voltage of the second incoming line, and comparing the voltage of the first incoming line and the voltage of the second incoming line, the switch control further configured to automatically route a Mic Bias type signal to the Mic Bias output line and a Ground type signal to the Ground output line, without user intervention.

13. The headset of claim 12, wherein the switch control is further configured to route the signal with the higher voltage to the Mic Bias output line and the signal with the lower voltage to the Ground output line.

14. The headset of claim 12, wherein the first incoming line is coupled with a pin 3 on the source device, and wherein the switch control is further configured to automatically route the signal on the first incoming line to the Ground output line if the voltage of the first incoming line and the voltage of the second incoming line are the same.

15. The headset of claim 12, further comprising:

a switch operably connected with the switch control and the Ground output line, the switch further configured to be in a default closed position.

16. The headset of claim 12, further comprising:

a left audio output line operably connected with the switch control; and a right audio output line operably connected with the switch control;

the switch control further configured to route a left audio type signal to the left audio output line and a right audio type signal to the right audio output line.

17. The system of claim 7 further comprising a cord coupled with the plug, the cord comprising the switch control.

18. The system of claim 7 further comprising an inline control coupled with the plug, the inline control comprising the switch control.

19. The headset of claim 12 wherein the microphone comprises a housing and wherein the switch control is located within the microphone housing.

20. The headset of claim 12 further comprising an earbud comprising a housing wherein the switch control is located within the earbud housing.

21. The switchable plug of claim 1 wherein the switch control is electromechanical.

22. The switchable plug of claim 1 wherein the switch control is electronic.

23. The switchable plug of claim 1 wherein the switch control is electro-optic.

24. The switchable plug of claim 1 wherein the switch control is further configured to automatically route the Mic Bias type signal through a first switch to the Mic Bias output line and a Ground type signal though a second switch to the Ground output line, without user intervention.

25. The switchable plug of claim 1 further comprising at least one switch operably coupled with the switch control.

* * * * *